(12) United States Patent
Hoffman

(10) Patent No.: US 9,914,284 B2
(45) Date of Patent: Mar. 13, 2018

(54) MAGNETIC INSULATION

(71) Applicant: Hydra Heating Industries, LLC, Atlanta, GA (US)

(72) Inventor: Michael Hoffman, Atlanta, GA (US)

(73) Assignee: Hydra Heating Industries, LLC, Atlanta, GA (US)

( * ) Notice: Subject to any disclaimer, the term of this patent is extended or adjusted under 35 U.S.C. 154(b) by 0 days.

(21) Appl. No.: 15/449,245

(22) Filed: Mar. 3, 2017

(65) Prior Publication Data

US 2017/0173920 A1    Jun. 22, 2017

Related U.S. Application Data

(63) Continuation-in-part of application No. 15/229,888, filed on Aug. 5, 2016.

(Continued)

(51) Int. Cl.
*B32B 15/08* (2006.01)
*B32B 5/02* (2006.01)
(Continued)

(52) U.S. Cl.
CPC .............. *B32B 15/08* (2013.01); *B32B 3/085* (2013.01); *B32B 5/02* (2013.01); *B32B 7/08* (2013.01); *B32B 15/043* (2013.01); *B32B 15/06* (2013.01); *B32B 27/28* (2013.01); *B63B 3/68* (2013.01); *B63B 43/16* (2013.01); *E04B 1/80* (2013.01); *F41H 5/013* (2013.01); *F41H 5/226* (2013.01); *F41H 7/042* (2013.01); *G09F 9/00* (2013.01); *B32B 2262/0269* (2013.01); *B32B 2262/101* (2013.01); *B32B 2307/102* (2013.01); *B32B 2307/208* (2013.01); *B32B 2307/304* (2013.01); *B32B 2571/02* (2013.01); *B32B 2590/00* (2013.01); *B32B 2605/08* (2013.01); *B32B 2605/12* (2013.01)

(58) Field of Classification Search
CPC ................ E04F 13/088; E04F 13/0883; E04F 15/02144; Y10S 52/04; Y10S 428/90; Y10S 428/23979; Y10S 428/24; Y10T 24/328; E04B 1/80; B32B 3/085; B32B 5/02; B32B 7/08; B32B 15/043; B32B 15/06; B32B 15/08; B32B 27/28; B32B 2262/0269; B32B 2262/101; B32B 2307/102; B32B 2307/208; B32B 2307/304; B32B 2571/02; B32B 2590/00; B32B 2605/08; B32B 2605/12; B63B 3/68; B63B 43/16; F41H 5/013; F41H 5/226; F41H 7/042; G09F 9/00
USPC ...................................... 52/DIG. 4
See application file for complete search history.

(56) References Cited

U.S. PATENT DOCUMENTS 1,715,044 A * 5/1929 Reiter ................ A44B 17/0017
24/103
2,192,643 A * 3/1940 Kennedy .............. A47C 21/022
24/710.4

(Continued)

*Primary Examiner* — James M Ference
(74) *Attorney, Agent, or Firm* — Thomas Horstemeyer, LLP

(57) ABSTRACT

Various insulations that employ magnetic components are disclosed herein. A sheet insulation component is formed out of an insulation material. A sheet magnetic component is attached to the face of the sheet insulation component. The sheet magnetic component substantially covers the face of the sheet insulation component.

20 Claims, 5 Drawing Sheets

Related U.S. Application Data

(60) Provisional application No. 62/202,114, filed on Aug. 6, 2015, provisional application No. 62/303,253, filed on Mar. 3, 2016, provisional application No. 62/449,089, filed on Jan. 22, 2017.

(51) Int. Cl.
| | | |
|---|---|---|
| *B32B 3/08* | (2006.01) | |
| *B32B 7/08* | (2006.01) | |
| *B32B 15/04* | (2006.01) | |
| *B32B 15/06* | (2006.01) | |
| *B32B 27/28* | (2006.01) | |
| *B63B 3/68* | (2006.01) | |
| *B63B 43/16* | (2006.01) | |
| *G09F 9/00* | (2006.01) | |
| *E04B 1/80* | (2006.01) | |
| *F41H 7/04* | (2006.01) | |
| *F41H 5/22* | (2006.01) | |
| *F41H 5/013* | (2006.01) | |

(56) References Cited

U.S. PATENT DOCUMENTS

| | | | | |
|---|---|---|---|---|
| RE23,636 | E | | 3/1953 | Wilson |
| 2,649,330 | A | | 8/1953 | Schamel |
| 2,742,250 | A | * | 4/1956 | Cronberger ............ A47G 1/17 24/303 |
| 2,880,015 | A | | 3/1959 | Harben |
| 2,932,545 | A | * | 4/1960 | Foley ..................... E05C 19/16 206/818 |
| 2,959,832 | A | | 11/1960 | Baermann |
| 3,041,694 | A | * | 7/1962 | Hansen ................ A47C 31/026 24/103 |
| 3,086,247 | A | | 4/1963 | Rubens |
| 3,095,668 | A | | 7/1963 | Dorsett |
| 3,111,728 | A | * | 11/1963 | Alderfer .............. E05C 19/161 264/104 |
| 3,112,163 | A | * | 11/1963 | Alderfer ............ B29C 44/1271 264/278 |
| 3,116,739 | A | | 1/1964 | Andonie |
| 3,121,977 | A | * | 2/1964 | Bersudsky .............. E04B 2/707 428/47 |
| 3,147,176 | A | | 9/1964 | Haslam |
| 3,152,716 | A | | 10/1964 | Feldhahn |
| 3,235,427 | A | * | 2/1966 | Koritz ..................... H01F 1/06 156/279 |
| 3,243,374 | A | * | 3/1966 | Gillard .................... C08K 3/24 181/286 |
| 3,254,440 | A | | 6/1966 | Duggar |
| 3,260,788 | A | | 7/1966 | Stetson |
| 3,285,456 | A | | 11/1966 | Pewitt |
| 3,292,328 | A | * | 12/1966 | Darling .................. E04B 2/82 52/238.1 |
| 3,298,712 | A | | 1/1967 | Greenstadt |
| 3,314,196 | A | | 4/1967 | Betz et al. |
| 3,341,996 | A | * | 9/1967 | Jones ................ E04F 15/02144 427/127 |
| 3,365,684 | A | | 1/1968 | Stemke et al. |
| 3,378,974 | A | * | 4/1968 | Bush, Jr. ................ E04B 9/248 428/47 |
| 3,384,934 | A | * | 5/1968 | Bush, Jr. ................ E04B 9/248 24/303 |
| 3,456,373 | A | | 7/1969 | Epton |
| 3,463,455 | A | * | 8/1969 | Meckel ................... B21F 25/00 256/8 |
| 3,531,177 | A | | 9/1970 | Akin, Jr. |
| 3,553,872 | A | | 1/1971 | Ebner |
| 3,565,517 | A | | 2/1971 | Gitlin et al. |
| 3,609,934 | A | * | 10/1971 | O'Carroll .............. E04F 13/0801 428/900 |
| 3,629,756 | A | * | 12/1971 | Holtz .................... H01F 7/0215 101/389.1 |
| 3,636,727 | A | | 1/1972 | Naughton |
| 3,651,592 | A | | 3/1972 | McCormick et al. |
| 3,712,846 | A | * | 1/1973 | Daniels et al. ........... E04B 1/86 181/290 |
| 3,727,658 | A | | 4/1973 | Eldridge, Jr. |
| 3,788,924 | A | * | 1/1974 | Kobayashi et al. .... H01F 1/375 156/178 |
| 3,852,935 | A | * | 12/1974 | Jones .................... E04B 2/7457 52/238.1 |
| 3,864,881 | A | * | 2/1975 | Wolf ....................... E04B 1/343 49/142 |
| 3,876,034 | A | * | 4/1975 | Antonini .................. E04B 1/86 181/208 |
| 3,882,637 | A | * | 5/1975 | Lindenschmidt ....... F25D 23/02 29/451 |
| 3,897,288 | A | * | 7/1975 | Fayling ................. B23Q 3/1546 156/289 |
| 3,897,928 | A | * | 8/1975 | Eisler ..................... B28B 7/42 249/78 |
| 3,902,940 | A | | 9/1975 | Heller, Jr. et al. |
| 3,918,233 | A | * | 11/1975 | Simpson ................ E04B 7/105 52/536 |
| 3,924,377 | A | | 12/1975 | Gill |
| 3,935,361 | A | | 1/1976 | Dorfman et al. |
| 3,943,912 | A | | 3/1976 | Nakayama |
| 3,950,894 | A | | 4/1976 | DiMaio |
| 3,965,599 | A | | 6/1976 | Ebner |
| 3,969,572 | A | | 7/1976 | Rostek |
| 3,987,567 | A | | 10/1976 | Fritts |
| 4,023,651 | A | * | 5/1977 | Healiss ................. G10K 11/16 181/207 |
| 4,040,194 | A | | 8/1977 | Penton et al. |
| 4,041,667 | A | * | 8/1977 | Lindner ................ E04B 2/7457 52/241 |
| 4,125,984 | A | * | 11/1978 | Jonas ..................... E04B 1/617 52/281 |
| 4,139,841 | A | * | 2/1979 | Roberts .................. G09F 9/375 340/815.62 |
| 4,154,226 | A | | 5/1979 | Hennig et al. |
| 4,162,672 | A | | 7/1979 | Yazaki |
| 4,187,187 | A | | 2/1980 | Turbeville |
| 4,197,618 | A | | 4/1980 | Bourguignon |
| 4,219,218 | A | | 8/1980 | Waldon |
| 4,232,084 | A | * | 11/1980 | Tate ........................ G09F 9/375 428/321.5 |
| 4,234,378 | A | | 11/1980 | Iwasaki et al. |
| 4,245,442 | A | * | 1/1981 | Durham ................ E04B 2/7455 52/126.4 |
| 4,272,942 | A | * | 6/1981 | Jackson .................. E06B 3/28 428/900 |
| 4,310,137 | A | | 1/1982 | Frye |
| 4,342,904 | A | | 8/1982 | Onsager |
| 4,364,208 | A | * | 12/1982 | Wilson ................. E04B 1/3211 220/592.27 |
| 4,430,835 | A | * | 2/1984 | Ericson ................ B66B 11/0253 24/306 |
| 4,462,193 | A | * | 7/1984 | Ericson ................ B66B 11/0253 24/306 |
| 4,468,902 | A | * | 9/1984 | Wilson ................. E04B 1/3211 52/249 |
| 4,469,383 | A | * | 9/1984 | Losert ................... F25D 23/087 312/296 |
| 4,473,980 | A | * | 10/1984 | Foster ..................... E06B 3/28 49/62 |
| 4,478,384 | A | | 10/1984 | Julseth |
| 4,486,995 | A | * | 12/1984 | Allen ..................... E04C 2/205 428/461 |
| 4,561,223 | A | * | 12/1985 | Gold ....................... E06B 3/28 49/478.1 |
| 4,584,223 | A | | 4/1986 | Krapf |
| 4,610,291 | A | * | 9/1986 | Carroll ................. E06B 9/0638 126/569 |
| 4,635,410 | A | * | 1/1987 | Chumbley .............. B44C 7/022 160/378 |
| 4,640,808 | A | | 2/1987 | Okumura et al. |
| 4,663,874 | A | * | 5/1987 | Sano ....................... G09F 7/04 40/600 |

(56) References Cited

U.S. PATENT DOCUMENTS

| | | | | |
|---|---|---|---|---|
| 4,673,542 | A | 6/1987 | Wigner et al. | |
| 4,678,150 | A | 7/1987 | Newman et al. | |
| 4,703,575 | A | 11/1987 | Diamond | |
| 4,709,517 | A * | 12/1987 | Mitchell | E04B 2/7412 52/145 |
| 4,709,522 | A * | 12/1987 | Carnahan | E04F 19/0436 52/288.1 |
| 4,731,961 | A * | 3/1988 | Bona | E04B 2/82 135/142 |
| 4,735,284 | A | 4/1988 | Gahlau et al. | |
| 4,769,166 | A | 9/1988 | Harrison | |
| 4,800,662 | A | 1/1989 | Belrose | |
| 4,810,015 | A | 3/1989 | McNeil | |
| 4,832,396 | A * | 5/1989 | Moreno | E05C 19/161 296/164 |
| 4,833,018 | A * | 5/1989 | Ruehl | B32B 11/08 428/332 |
| 4,873,102 | A | 10/1989 | Chang et al. | |
| 4,884,824 | A | 12/1989 | Radke | |
| 4,934,119 | A * | 6/1990 | Ybarra | E04B 2/7409 52/238.1 |
| 4,941,236 | A | 7/1990 | Sherman et al. | |
| 4,959,997 | A | 10/1990 | Aisa et al. | |
| 4,961,849 | A | 10/1990 | Hull et al. | |
| 5,009,625 | A | 4/1991 | Longuet-Higgins | |
| 5,021,021 | A | 6/1991 | Ballard | |
| 5,031,874 | A | 7/1991 | Shannon | |
| 5,035,017 | A | 7/1991 | Komuro | |
| 5,053,274 | A * | 10/1991 | Jonas | C08K 3/0033 428/332 |
| 5,092,019 | A | 3/1992 | Levy | |
| 5,127,652 | A | 7/1992 | Unger | |
| 5,238,721 | A * | 8/1993 | Nakazawa | E04F 15/02 156/299 |
| 5,267,763 | A | 12/1993 | Klein | |
| 5,271,200 | A * | 12/1993 | Witt | A47G 27/0475 52/385 |
| D343,864 | S | 2/1994 | Rebong | |
| 5,295,342 | A * | 3/1994 | Roche | G09F 7/04 40/600 |
| 5,342,665 | A | 8/1994 | Krawitz | |
| 5,363,579 | A * | 11/1994 | Plumly | G09F 7/04 40/600 |
| 5,384,999 | A * | 1/1995 | Roche | G09F 7/04 40/600 |
| 5,447,790 | A | 9/1995 | Funae et al. | |
| 5,452,508 | A | 9/1995 | Wu | |
| 5,484,970 | A * | 1/1996 | Suzuki | E04B 1/84 181/286 |
| 5,503,891 | A | 4/1996 | Marshall et al. | |
| 5,534,097 | A | 7/1996 | Fasano et al. | |
| 5,538,132 | A | 7/1996 | Propp et al. | |
| 5,545,157 | A | 8/1996 | Van Iten | |
| 5,622,504 | A * | 4/1997 | Hance | G09B 29/001 434/421 |
| 5,709,053 | A * | 1/1998 | Kuroda | B29B 17/0026 181/284 |
| 5,778,580 | A * | 7/1998 | Zarelius | G09F 15/0062 160/351 |
| 5,800,896 | A | 9/1998 | Kobayashi | |
| 5,806,346 | A | 9/1998 | Schlinger et al. | |
| 5,832,831 | A | 11/1998 | Boyle et al. | |
| 5,833,795 | A | 11/1998 | Smith et al. | |
| 5,847,316 | A * | 12/1998 | Takada | H05K 9/0001 174/374 |
| 5,852,890 | A | 12/1998 | Pynenburg | |
| 5,891,315 | A | 4/1999 | Nash | |
| 5,919,540 | A * | 7/1999 | Bailey | B32B 3/266 15/217 |
| 5,919,541 | A | 7/1999 | Emory | |
| 5,927,033 | A * | 7/1999 | Kreckl | E04F 13/0883 156/310 |
| 5,974,753 | A * | 11/1999 | Hsu | E04F 13/0862 52/287.1 |
| 5,984,043 | A | 11/1999 | Ruhe et al. | |
| 5,984,855 | A | 11/1999 | DiNapoli | |
| 6,042,057 | A | 3/2000 | Rice | |
| 6,062,688 | A | 5/2000 | Vinas | |
| 6,090,478 | A * | 7/2000 | Nishizaki | B32B 5/02 428/297.4 |
| 6,113,142 | A | 9/2000 | Tolbert | |
| 6,122,955 | A | 9/2000 | Hoog et al. | |
| 6,305,656 | B1 | 10/2001 | Wemyss | |
| 6,318,569 | B1 * | 11/2001 | Rothing | A47B 96/027 108/152 |
| 6,344,021 | B1 | 2/2002 | Juster et al. | |
| 6,367,126 | B1 | 4/2002 | Rivkin | |
| 6,406,418 | B1 | 6/2002 | Getek | |
| 6,406,783 | B1 | 6/2002 | Phillips et al. | |
| 6,484,428 | B1 | 11/2002 | Greenwald et al. | |
| 6,502,933 | B2 | 1/2003 | Lim et al. | |
| 6,553,724 | B1 | 4/2003 | Bigler | |
| 6,575,328 | B1 | 6/2003 | Foraker | |
| 6,599,419 | B2 | 7/2003 | Hagans | |
| 6,620,464 | B2 * | 9/2003 | Sciandra | E04F 21/04 427/127 |
| 6,632,168 | B2 | 10/2003 | Roberts et al. | |
| 6,663,128 | B2 | 12/2003 | Dichter | |
| 6,668,504 | B2 * | 12/2003 | Hughart | E04B 2/7457 181/284 |
| 6,673,258 | B2 | 1/2004 | Purizhansky | |
| 6,701,677 | B2 * | 3/2004 | Gresham | E04B 2/7422 52/220.7 |
| 6,774,066 | B1 * | 8/2004 | Souza | B32B 15/04 138/99 |
| 6,821,573 | B1 * | 11/2004 | Paping | B60Q 7/00 116/28 R |
| 6,846,379 | B1 | 1/2005 | Bove et al. | |
| 6,857,809 | B2 | 2/2005 | Granata | |
| 6,889,457 | B2 | 5/2005 | Boddie | |
| 6,897,752 | B2 | 5/2005 | Dixon et al. | |
| 6,953,105 | B2 * | 10/2005 | Rust | B32B 7/14 181/286 |
| 7,063,878 | B1 | 6/2006 | Poulakis | |
| 7,125,595 | B2 * | 10/2006 | Kobayashi | A47L 23/266 428/101 |
| 7,153,113 | B2 | 12/2006 | Graham et al. | |
| 7,187,261 | B2 | 3/2007 | Cassar | |
| 7,275,334 | B2 | 10/2007 | Horst | |
| 7,307,501 | B2 | 12/2007 | Doi | |
| 7,332,101 | B2 | 2/2008 | Singh et al. | |
| 7,461,750 | B2 | 12/2008 | Armstrong | |
| 7,469,869 | B2 | 12/2008 | Killion | |
| 7,503,136 | B1 | 3/2009 | McDonald | |
| 7,510,092 | B2 * | 3/2009 | Sholem | B25H 3/04 211/70.6 |
| 7,641,534 | B2 | 1/2010 | Holman | |
| 7,694,440 | B1 | 4/2010 | Wu | |
| 7,740,215 | B2 | 6/2010 | Lang | |
| 7,772,504 | B1 | 8/2010 | Tashjian | |
| 7,992,265 | B2 | 8/2011 | Suenaga | |
| 8,079,568 | B2 | 12/2011 | Heinrich et al. | |
| 8,152,709 | B2 | 4/2012 | Szeto | |
| 8,261,736 | B1 * | 9/2012 | Olivarri | A47G 5/04 126/545 |
| 8,307,600 | B2 | 11/2012 | Heartsfield | |
| 8,366,283 | B2 | 2/2013 | Sierra | |
| 8,376,409 | B2 | 2/2013 | Rosset | |
| 8,408,627 | B2 | 4/2013 | Mann | |
| 8,458,863 | B2 | 6/2013 | Hunts | |
| 8,613,881 | B2 | 12/2013 | Soong | |
| 8,656,674 | B1 * | 2/2014 | Woodward | E04F 13/0883 52/388 |
| 8,684,783 | B2 | 4/2014 | Ehrsam | |
| 8,689,464 | B2 | 4/2014 | Rodman et al. | |
| 8,727,404 | B2 | 5/2014 | Martin | |
| 8,734,669 | B2 | 5/2014 | Tomiyama et al. | |
| 8,757,698 | B1 * | 6/2014 | Rowland | B60N 3/044 296/97.23 |
| 8,785,623 | B2 | 7/2014 | Olsson et al. | |

(56) References Cited

U.S. PATENT DOCUMENTS

| | | | |
|---|---|---|---|
| 8,943,723 B2 | 2/2015 | Valentine et al. | |
| 8,999,478 B1* | 4/2015 | Medlen | E06B 3/7001 428/99 |
| 9,251,458 B2 | 2/2016 | Finn et al. | |
| 9,271,586 B2 | 3/2016 | Ryan | |
| 2002/0078612 A1* | 6/2002 | Meacham | G09F 7/04 40/711 |
| 2002/0130231 A1* | 9/2002 | Winnard | B25H 3/04 248/206.5 |
| 2003/0077465 A1* | 4/2003 | Boudouris | B32B 27/18 428/469 |
| 2003/0180499 A1* | 9/2003 | Kobayashi | A47L 23/266 428/95 |
| 2004/0006902 A1* | 1/2004 | Zarelius | G09F 15/00 40/600 |
| 2004/0006903 A1 | 1/2004 | Haytas | |
| 2004/0053002 A1* | 3/2004 | Kobayashi | A47L 23/266 428/95 |
| 2004/0093811 A1* | 5/2004 | Oakey | A47G 27/025 52/177 |
| 2004/0231212 A1* | 11/2004 | Roche | B32B 3/06 40/600 |
| 2005/0170739 A1 | 8/2005 | Zoellner | |
| 2005/0246971 A1* | 11/2005 | Ortega | E04D 5/145 52/90.1 |
| 2005/0276982 A1* | 12/2005 | Manchee | B32B 9/02 428/411.1 |
| 2006/0198977 A1* | 9/2006 | Meservey | B32B 33/00 428/40.1 |
| 2007/0114812 A1* | 5/2007 | Hunt | B60R 13/08 296/181.6 |
| 2007/0119804 A1* | 5/2007 | Antonioni | A47F 5/0807 211/86.01 |
| 2007/0241071 A1* | 10/2007 | Antonioni | A47F 5/0807 211/87.01 |
| 2008/0092731 A1* | 4/2008 | Hall | B29C 70/086 89/36.04 |
| 2008/0166508 A1* | 7/2008 | Edwards | B29C 44/3411 428/34.1 |
| 2008/0202053 A1* | 8/2008 | Guy | E04F 15/02144 52/391 |
| 2008/0236052 A1* | 10/2008 | Fleming | E04B 1/803 52/2.22 |
| 2008/0282632 A1* | 11/2008 | Sleeman | B32B 27/06 52/309.1 |
| 2008/0302049 A1* | 12/2008 | Stoneburner | B60R 13/08 52/506.02 |
| 2009/0044460 A1* | 2/2009 | Medley | E04B 1/3444 52/71 |
| 2009/0044485 A1* | 2/2009 | Carolan | E04D 3/28 52/800.1 |
| 2009/0133342 A1* | 5/2009 | Copeland | E04B 9/003 52/202 |
| 2009/0205280 A1* | 8/2009 | Coppersmith | E04B 1/803 52/506.01 |
| 2009/0230068 A1* | 9/2009 | Wang | A47B 47/00 211/134 |
| 2009/0250574 A1* | 10/2009 | Fullerton | G09F 7/04 248/206.5 |
| 2009/0250575 A1* | 10/2009 | Fullerton | G09F 7/04 248/206.5 |
| 2010/0095953 A1* | 4/2010 | Husted | F24B 1/191 126/500 |
| 2010/0276382 A1* | 11/2010 | Antonioni | A47F 5/0807 211/59.2 |
| 2010/0290212 A1 | 11/2010 | Francis | |
| 2010/0326336 A1* | 12/2010 | Struthers | B32B 13/12 109/78 |
| 2011/0083254 A1 | 4/2011 | Trutna et al. | |
| 2011/0115355 A1* | 5/2011 | Heckler | A47L 15/4257 312/405 |
| 2011/0174953 A1 | 7/2011 | Ruiz et al. | |
| 2011/0236621 A1* | 9/2011 | Sampson | B32B 7/045 428/99 |
| 2011/0283627 A1 | 11/2011 | Shaw | |
| 2012/0103177 A1* | 5/2012 | Coltrane | B60F 3/0038 89/36.02 |
| 2012/0143165 A1 | 6/2012 | Macura et al. | |
| 2012/0167505 A1* | 7/2012 | Krause | E04F 13/0817 52/302.1 |
| 2012/0189810 A1* | 7/2012 | Whitener | B05D 3/12 428/141 |
| 2012/0279157 A1* | 11/2012 | Sha | E04F 13/0883 52/578 |
| 2013/0032310 A1* | 2/2013 | Jaena | F28D 15/02 165/104.25 |
| 2013/0061431 A1 | 3/2013 | Naftali et al. | |
| 2013/0067819 A1* | 3/2013 | McLain | E06B 5/01 49/463 |
| 2013/0111840 A1* | 5/2013 | Bordener | E04B 1/68 52/393 |
| 2013/0167474 A1* | 7/2013 | Carlson | F25D 23/028 52/784.15 |
| 2013/0222091 A1* | 8/2013 | Fullerton | H01F 7/0257 335/295 |
| 2014/0054434 A1 | 2/2014 | Chen | |
| 2014/0090312 A1* | 4/2014 | Medley | E04B 1/34357 52/79.5 |
| 2014/0096467 A1* | 4/2014 | Norton | E04F 13/0833 52/582.2 |
| 2014/0137450 A1 | 5/2014 | Knez | |
| 2014/0227934 A1 | 8/2014 | Rudiseill | |
| 2014/0302772 A1* | 10/2014 | Nizich | F24F 13/06 454/334 |
| 2015/0020468 A1* | 1/2015 | Wickstrom | E04F 13/0816 52/274 |
| 2015/0048097 A1* | 2/2015 | Jeffries | B65D 90/06 220/592.25 |
| 2015/0367245 A1 | 12/2015 | Ahn et al. | |
| 2016/0001093 A1 | 1/2016 | Wulfcrona et al. | |
| 2016/0198782 A1 | 7/2016 | Thompson | |
| 2016/0242504 A1 | 8/2016 | Cowley et al. | |
| 2016/0354495 A1 | 12/2016 | Harmer et al. | |

* cited by examiner

FIG. 2A  FIG. 2B

MAGNETIC INSULATION

CROSS-REFERENCE TO RELATED APPLICATIONS

This application is a Continuation-in-Part of co-pending U.S. Non-Provisional application Ser. No. 15/229,888, entitled "Magnetic Clasps for Insulation," filed Aug. 5, 2016, which claims priority to U.S. Provisional Application No. 62/202,114, filed Aug. 6, 2015, and claims the benefit of, and priority to, U.S. Provisional Application No. 62/303,253, entitled "Magnetic Sheet Facing for Insulation," filed on Mar. 3, 2016, and U.S. Provisional Application No. 62/449,089, entitled "Magnetic Insulation Connectors," filed on Jan. 22, 2017, each of which applications are hereby incorporated herein by reference in their entirety.

BACKGROUND

Insulation may be used for many different purposes. Where high or low environmental temperatures may occur, insulation may protect objects from condensation, freezing, melting, expansion, contraction, and other effects. Energy may be saved by using insulation to maintain temperature. Insulation can also serve to control noise, protect from physical damage, and for other purposes.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

FIGS. 2A-2C illustrate perspective views of examples of magnetic clasps including helix attachment components according to various embodiments.

DETAILED DESCRIPTION

Figure 1A:
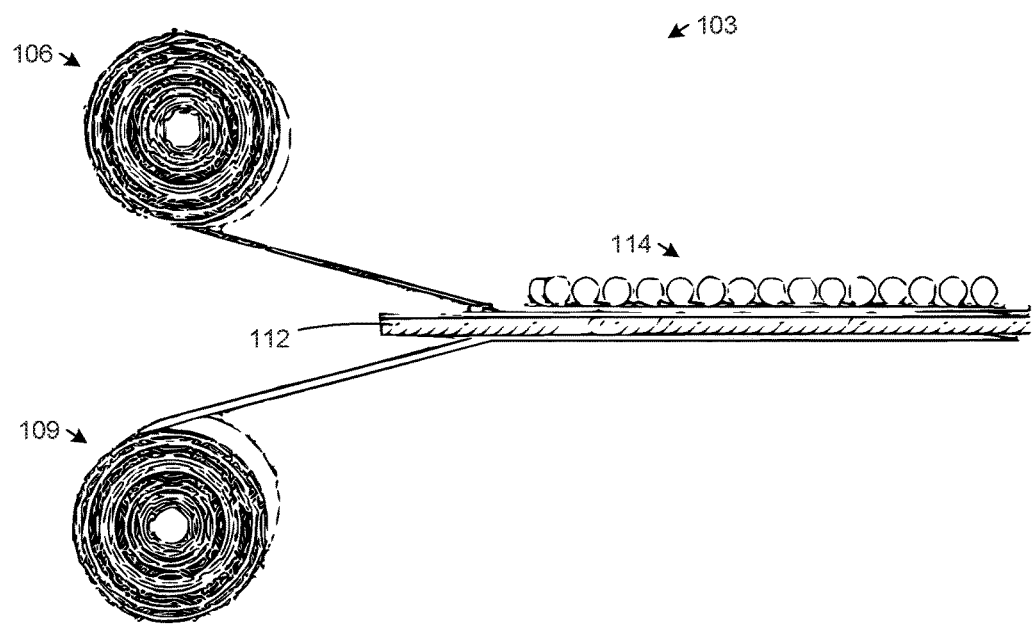
FIG. 1A illustrates an example of magnetic insulation including a sheet magnetic component being applied to a sheet insulation component, according to an embodiment.

Magnetic insulation or other materials are disclosed herein. The term magnetic material can include any material capable of producing a magnetic field such as, for example, ferromagnetic materials, and can be anisotropically or isotropically charged. Insulation combined with magnetic material is practical because it saves labor time during installation and is simple to remove and replace. It is useful in any application that has a magnetically attractive substrate and temperatures within the tolerances of the insulation and magnetic material.

Flexible and rigid magnetized panels or sheets in single, dual, and multiple layers can be achieved. The layers can be applied on an extrusion line during manufacturing, or can be applied post manufacturing directly on the insulation, or on the face (foil, paint, plastic or other face) post extrusion. The panels or sheets can include sandwiched sheet magnetic components attached to sheet insulation components that include polyurea, aramid, para-aramid, or other materials. The sheet magnetic component with magnetized polyurea, aramid, para-aramid material can be attached to a sheet insulation component of non-magnetized polyurea, aramid, para-aramid yarn or other material. Strong magnetic panels, strips, or sheets have a variety of uses. Uses can include signs and posters, windbreaks, re-facing metal insulated panels, retrofitting existing steel buildings, new buildings, ductwork, tank hole plugging, and other armor applications for vehicles and other structures, and further applications are described. In some cases, the panels or sheets can be cut into specific shapes, or can be joined edge to edge to cover or form a particular shape.

In some embodiments, magnetic material described herein can incorporate materials compatible with insulation materials; for example, magnetic material can be made of 80% ferromagnetic material (e.g., neodymium, or others) and 20% insulation material (e.g., polyurea, or others), or other ratios. A magnetic material mixture including ferromagnetic material and insulation material can make a physically resilient or tough magnet that can bond well with materials similar or compatible to the insulation material. In further embodiments, the magnetic material can include other insulation materials, other ferromagnetic materials or ferromagnetic ores, and in different proportions. The magnetic materials described herein can alternatively not include any insulation material(s).

In some embodiments, a sheet of magnetic material can be attached or bonded to a sheet of non-magnetic material such that the sheet of magnetic material can cover a face or surface area of the non-magnetic material. In this way, single layered, dual-layered, or multi-layers of magnetic material and non-magnetic material can be incorporated. Such insulation sheets with magnetic sheet facing can be rigid or flexible and can be designed and used for a variety of purposes. For example, an insulation component can be chosen for temperature insulation sound insulation, physical protection or resilience, armor, and flexibility, among other properties. Polystyrene, polyethylene, polyolefin, polyurethane, polyisocyanurate, polymide, phenolic foams, elastomeric foams, cellular glass, silica aerogel, mineral fiber, high temperature fiber, perlite, microporous, granular, calcium silicate, textile glass, melamine, polyurea, fiberglass, PVC jacket, PVDC film, metal rolls and sheets, and other insulation materials can also be used along with the magnetic materials, components, and closures described herein. Insulation materials can also include mineral wool, which can include mineral fiber, mineral cotton, man-made mineral fiber (MMMF), and man-made vitreous fiber (MMVF). The nomenclature of these wool products can be the parent/raw material name in the prefix to "wool." Specific mineral wool products can include stone wool, slag wool, and glass wool.

Flexible magnets can be made by mixing a ferrite powder (and or other magnetizable materials like ceramic, alnico, SmCo, NdFeB or other), with a polymer base resin. The mixture can be pressed, extruded, or calendared, and magnetized by exposure to appropriate oersted levels. A magnetizing charge can be applied electronically, from an array of permanent magnets, or otherwise. Polyurea can be magnetized by mixing magnetizable materials therein and magnetizing the polyurea mixture. Powders and sands, glass and other aggregates can also be mixed into polyurea mixtures to achieve other physical properties.

Some embodiments provide for strong bonds between the magnetic component and the insulation component, allowing strong magnetic force to be used. For example, in one embodiment, the magnetic components of magnetic insulation can include neodymium and polyurea (e.g., about 80% neodymium and 20% polyurea, or other ratios). In other embodiments, the mixture can include polyurea and iron. Such a mixture can be formed into a magnetic sheet facing and attached to an insulation component that can be a non-magnetic sheet of insulation material. The insulation material can be an armor-like polyurea mixture. Some polyurea mixtures can be used for physically strong, armor-type insulation applications. Further embodiments can include aramid, or para-aramid, synthetic fiber. Meta-aramid insulation can be used for thermal, chemical, and radiation resistance. Magnetic components can include polyurea, aramid, para-aramid, or meta aramid mixed with a ferromagnetic material.

In the finished product the sheet magnetic component can substantially cover a face of the sheet insulation component. In this context, the magnetic sheet component substantially covering a face of the sheet insulation component allows magnetic clasps or discrete magnetic components, discrete connectors, (and other objects or materials) to be between the sheet magnetic component and the sheet insulation component. In some cases the sheet magnetic component can be attached around the exterior edge of the sheet insulation component with a center area of the face not covered.

In one process, the sheets can be made by pouring a mixture into wax bottom molds, and then magnetized with a controlled capacitor discharge. A custom magnetizer can be built to provide sufficient headroom for the sheet size. In some case, after the magnetization and before the polyurea magnetizable ore mix is fully cured, another layer of polyurea (or blend of polyurea with another substance) can be poured, sprayed, or affixed by other means on top of the magnetized sheet. If timing is important, a "primer" can be used to assure as good adhesion to the magnetized polyurea as possible can be achieved. The resultant dual layer is resilient and strong.

Designing magnetic components as a mixture that includes the insulation material of the insulation component to which it is to be attached can achieve a stronger bond. For example, if the insulation component is polyurea, a magnetic component, including a ferromagnetic material and polyurea can be attached to the insulation component before at least one of the insulation component or the magnetic component is fully cured. The similarity of materials can also serve to give the assembled product more uniform flexibility or rigidity. In other examples, the magnetic component can be a different material from the insulation component. Sheets of insulation with magnetic facing can be formed (e.g., molded) and/or cut to fit a particular application, and can be any shape.

The mixture forming a magnetic component can be sprayed, poured, extruded, molded, rolled or otherwise formed into a sheet using industrial processes. A sheet magnetic component can also be formed into a roll of the sheet magnetic component. The insulation component can be sprayed, poured, extruded, molded, rolled, or otherwise formed into a sheet insulation component. In some cases, the magnetic component is not completely cured before the insulation component is poured, extruded, molded, rolled or otherwise attached to the magnetic component. In some cases, the insulation component is not completely cured before the magnetic component is poured, extruded, molded, rolled or otherwise attached to the insulation component. In further embodiments, the components can be attached using mechanical attachment, interference, friction, glue, epoxy, or other methods. While the above description mentions a single magnetic component layer and a single insulation component layer, single layered, dual-layered, or multi-layers of magnetic material and non-magnetic material can be incorporated.

The sheet magnetic component can also be attached or connected to the sheet insulation component using a plurality of attachment components. Each attachment component can include a fin, wedge, arrow, or other shape. The attachment component can be designed to aid the attachment between the sheet magnetic component and the insulation component, and can prevent pull-out of the attachment component from the insulation component. This can be used where the insulation component or sheet insulation component is thick, and/or where the insulation is fibrous (e.g., fiberglass or wool-like), foam-based, or insubstantial, and where the components are not cured together. In some examples, each attachment component includes a discrete magnet, such as a disc-shaped or other discrete magnetic clasp. The discrete magnets or magnetic clasps can aid attachment of the sheet magnetic component to the attachment component, and can provide additional magnetic pull. In some cases, a discrete connector that is non-magnetic can be attached to and used with each attachment component. The discrete connector can aid the attachment between the sheet magnetic component and the insulation, and can be otherwise similar to a discrete magnetic component.

The magnetic material or mixture can be chosen to match the composition of insulation to be held with the magnetic clasp. This can allow for a strong bond between the magnetic material of the magnetic component of the clasp to the insulation material. In some embodiments, the magnetic material or mixture chosen includes a material similar to or the same as the insulation material. In other embodiments, any materials that allow for a strong or solid bond can be used. Where a non-magnetic fin, arrow, trapezoid, wedge, or other shape is connected to the magnetic component, the non-magnetic material can also be chosen for its ability to bond well with the other materials in use.

As discussed, discrete magnetic components or magnetic clasps can also be used in conjunction with an insulation component. A magnetic clasp can have magnetic component(s) as well as non-magnetic component(s), for example, an attachment component, to aid a connection, attachment, or bond to insulation or other materials. For example, a magnetic clasp that is magnetized can be attracted to another magnetic clasp that is also magnetized. Alternatively, a magnetic clasp can produce an attraction with a clasp that is not itself magnetized. Also, a magnetic clasp can be attracted to other objects or materials for attachment to ferrous or ferromagnetic materials or structures that can be magnetized or unmagnetized including building, vehicles, signage, and other structures. The discrete magnetic component or magnetic clasp can be made in any shape using forms of various shapes. Discrete magnetic components can refer to strips of magnetic material, or can refer to any discrete shape such as circular, rectangular, hexagonal, or other shapes including irregular shapes. Discrete magnetic components can be formed (e.g., molded) and/or cut to fit a particular application.

Embodiments of the magnetic components can be formed from a base material, including but not limited to: Polyurea, Elastomeric, Cellular Glass, Polystyrene, Polyisocyanurate, Polyurethane, or any of the other insulation materials discussed herein. Other materials can also be used to make the compatible magnetic materials and the additional structure. These and other materials are mixed with the ferromagnetic material at the point of manufacture in a high ratio (e.g., 30-80%) by weight, forming a magnetic material.

In one embodiment, the ferromagnetic material and a resin blend formulation can include various amine terminated molecules of varying sizes and type can be mixed with a shear mixer. Next, polyisocyanate pre-polymer can be mixed in. The quickly setting mix is a slurry that is pressed into a mold. The slurry can set into the discrete magnetic clasp or component. One or more of these base materials as listed above are mixed in a similar fashion as described for polyurea with a magnetizable ore or a magnetizable substance at the point of manufacturing the component to be clasped (e.g., pipe insulation, sheets or others) making the magnetic clasping system incorporated into the manufacturing process. In some embodiments, the magnetic clasping system may be affixed after the components to be clasped are manufactured and installed with glue, friction, or other methods.

The magnetized components can be used for insulation components such as pipe insulation, sheet insulation, and other materials in a manner that is secure and non-destructive. The product may be attached and detached to walls, vehicles, signs, or other structures without damage to the product. This can be accomplished by joining the magnetic component to the insulation component in the various manners described above, in some cases with an additional attachment component or an attachment component with discrete magnetic clasps so that the magnetic component is structurally compatible and attached with the insulation component, and a strong bond is formed between the insulation component and magnetic component. The shape and form of the discrete magnets or magnetic clasps embedded into the insulation component can also be designed or chosen as desired to suit the application. In some cases, the discrete magnets or magnetic clasps and attachment components can be utilized with the insulation component but without the sheet magnetic component. In some cases, the sheet magnetic component can be utilized with the insulation component but without the discrete magnets or magnetic clasps and without the attachment components.

In some embodiments, sheets or boards of insulation with magnetic facing, such as the discrete magnets or magnetic clasps and/or the sheet magnetic component, can be made to fit together edge to edge, for example, by making complementary shapes at edges of the sheets or boards. In one embodiment, a top edge of a magnetic insulation sheet can have a shape that is complementary to a bottom edge of another magnetic insulation sheet to be placed above and adjacent to the insulation sheet. To this end, in some embodiments, a top edge of a magnetic sheet of insulation can have a shape that is complementary to a shape of its own bottom edge. In this case, many sheets having substantially the same shape can fit together top-to-bottom. Likewise, each edge of a sheet can be designed to be complementary to opposite edges (e.g. top-to-bottom, and left-to-right). For example, a tongue and groove, ship lap, butt joint, or other types of designs can be utilized.

In other embodiments, edge shapes can be specifically designed to fit with other specifically designed edge shapes of a magnetic sheet or board of insulation. For example, sheet edges that are designed to be a bottom piece can have a flat or otherwise specifically designed edge, and sheet edges that are designed to be a top piece can have another specifically designed edge, and so on. A magnetic sheet of insulation can be substantially square, or can be triangular, pentagonal, hexagonal, or other shapes. Multiple different shapes can be designed to fit together for a particular application. Also, in some embodiments, magnetic sheets or boards can be rigid, and in other embodiments, they can be flexible or rollable. In some embodiments, the magnetic sheets can be cut to fit a particular size or application, while maintaining their magnetic properties. To this end, magnetic strips can be designed to be able to be cut and maintain their magnetic properties, for example, by pole alignment in the magnetic strips. In other embodiments, a plurality of segmented strips or a plurality of magnetic clasps can be used, and the magnetic sheets can be cut between the segments, clasps, or strips.

A number of magnetic sheets or boards of insulation can be assembled into a larger shape. For example, magnetic sheets or boards of insulation that are rectangular in shape can be assembled into a larger rectangular shape. The magnetic properties of the magnetic sheets or boards can be achieved by attaching a magnetic clasp or magnetic clasping system to a sheet or board of insulation. In one embodiment, a magnetic facing such as the discrete magnets and/or the sheet magnetic component can be installed on sheets of insulation and can be assembled to insulate a walk-in cooler, or can be used for armored protection on a building, a vehicle, or other structure, or can be used as temporary signage.

Turning now to the drawings, various structural and functional aspects of the embodiments are described in further detail. It should be appreciated that the drawings are illustrative of examples. Further devices may look substantially different, while incorporating the principles described herein.

FIG. 1A is a stylized view a sheet magnetic component being applied to a sheet insulation component. In other embodiments, the sheet magnetic component can be thicker. Shown is a roll of flexible sheet magnetic material 106 that is used to make a sheet magnetic component. This flexible sheet magnetic material is unwound to become a facer or sheet magnetic component to attach to one side of extruded sheet insulation component 112. The other side of the sheet insulation component 112 is faced with a foil which is unwound from a roll of foil 109 and attached to the sheet insulation component 112. The sheet magnetic component may or may not be magnetized at this point. If not magnetized, the magnetic material can be magnetized by the use of rare earth magnets set into a magnetic array 114, or otherwise magnetized using a fixture that applies a magnetizing charge electronically or otherwise. In some cases, discrete sheet lengths may be cut from a magnetic material to form a sheet magnetic component, and applied with glue, epoxy, or otherwise to a sheet insulation component. In some cases, a layer of foil can be applied over the sheet magnetic component that covers the sheet magnetic component. The foil can be a thin sheet of metal such as aluminum, tin, copper, alloys, or other types of foil. In some cases the sheet magnetic component can be covered with a layer of rubber, polyurea, or other material to increase friction and maintain a position of the magnetic component held to a wall, vehicle, or structure.

Figure 1B:
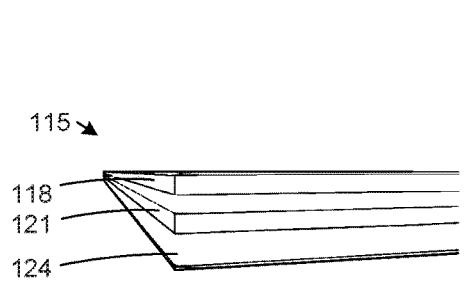
FIG. 1B illustrates a perspective exploded view of an example of magnetic insulation including a sheet magnetic component and a sheet insulation component, according to an embodiment.

FIG. 1B shows a sheet magnetic component 118, an insulation component 121, and foil 124. In some cases, the sheet magnetic component 118 can be a magnetized sheet made from a mixture of polyurea and ferromagnetic material. The insulation component 121 can be a nonmagnetic polyurea mixture. Sheet magnetic component 118 can be infused with a ferrite powder (and/or other magnetizable materials like ceramic, Alnico, SmCo, NdFeB or other) and mixed. It can then be poured, sprayed, pressed, extruded, calendered or otherwise combined in a form or free form containment. The sheet magnetic component 118 can then be exposed to a magnetizing charge from electromagnetic systems or permanent magnets, thus magnetizing the sheet magnetic component 118. The insulation component 121 can be used as a backing to the sheet magnetic component 118 to provide additional strength and cohesion. The insulation component 121 can be designed for use as armor for a building, vehicle or other structure, or can be thermal insulation for a cooler, or lettering for signage.

Figure 1C:
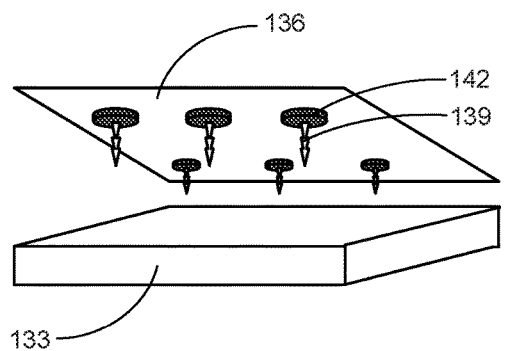
FIG. 1C illustrates a perspective view of a perspective exploded view of an example of magnetic insulation including a sheet magnetic component, a sheet insulation component, attachment components, and discrete magnetic components, according to an embodiment.

FIG. 1C shows a sheet magnetic component 136 to be attached to a sheet insulation component 133. A plurality of attachment components 139 can be used to aid attachment of the sheet magnetic component 136 to the sheet insulation component 133. The attachment components 139 are shown as a barbed or ridged attachment component 139 that can aid attachment into the sheet insulation component and prevent pull-out. Each attachment component 139 can be used in conjunction with a discrete magnetic component 142. The attachment component 139 and the discrete magnetic component 142 can be considered a magnetic clasp. In some embodiments, the attachment components 139 can be used with the sheet magnetic component 136 without the discrete magnetic components 142. In some cases, the attachment component 139 of the magnetic clasp can be inserted or attached to the sheet insulation component 133 before the sheet magnetic component 130 is applied as a facing to the sheet insulation component 133. In other cases, the magnetic clasp can be attached to the sheet magnetic component 136 before it is applied as a facing to the sheet insulation component 133. In some situations, the magnetic clasps can be used with the sheet insulation component 133 without the sheet magnetic component 136. While a particular arrangement of the discrete magnetic components 142 and attachment components 139 is shown in the figure, any arrangement including rows, offset rows and other arrangements of attachment components 139 and discrete magnetic components 142 can be used.

FIG. 2A shows a magnetic clasp 203 including a discrete magnetic component 206 and an attachment component 209. The attachment component 209 can be affixed to the discrete magnetic component 206 using a bracket assembly 212, which can include a nut and bolt, a countersunk bolt that penetrates the discrete magnetic component 206. A bracket assembly can have one or more supporting arms or bars that hold the attachment component 209 to the discrete magnetic component 206 with a nut, glue, epoxy, washer, clipped washer, rivet, or other attachments. The discrete magnetic component 206 can also be customized so the attachment component 209 can snap into the discrete magnetic component 206 and be held partially or fully with mechanical attachment, interference, friction, glue, epoxy, or other methods. The discrete magnetic component 206 can be rubber coated or coated in another material. In embodiments where no sheet magnetic component is used, a coating of rubber or another material can prevent shear slippage and require less magnetic force to stay in place, reducing the number of magnets needed. In embodiments with a sheet magnetic component over the discrete magnetic component 206, the coating of the discrete magnetic component or the coating can be chosen to aid adhesion between the sheet magnetic component and the discrete magnetic component 206 as the materials cure or using glue, epoxy, or other adhesion methods.

The attachment component 209 can be a spiral or helix shape. As shown, the attachment component 209 can be a circular helix shape of a particular diameter. The attachment component 209 can be useful for attachment to wool-like, fibrous, or weak insulation materials. The attachment component 209 can be an off-centric shape that allows mechanized high-speed placement. The attachment component 209 can be screwed in counter clockwise or clockwise depending on the configuring of the attachment component 209, in other words, whether the helix is a left-handed helix or a right-handed helix. The attachment component 209 can include a barb 215 or barb(s) 215 that allow the attachment component 209 to be screwed or otherwise inserted into a sheet insulation component while preventing pull out or unscrewing of the attachment component 209. While the barb 215 is shown at an end of the attachment component 209, barbs can be used anywhere along the length of the attachment component 209. For example, barbs can be on an inside of the helix or an outside of the helix, or in any other orientation to prevent the attachment component 209 from backing out or spinning out once in place in a sheet insulation component.

FIG. 2B shows a magnetic clasp 223 with a magnetic component 224 and an attachment component 225. The magnetic component 224 can be similar to that discussed for the magnetic clasp 203. In this embodiment, the attachment component 225 can include a conic helix shape that connects to the magnetic component 224 at one end of the conic helix. In this embodiment, the diameter of the conic helix at the attachment point can be smaller than a diameter of the conic helix at its termination point at its other end. The attachment component 225 can include barbs 227A, 227B, and 227C (i.e., barbs 227). The barbs 227 are shown on inside edges of the attachment component 225 along its length, but in other embodiments can be attached on outside edges.

Figure 2C:
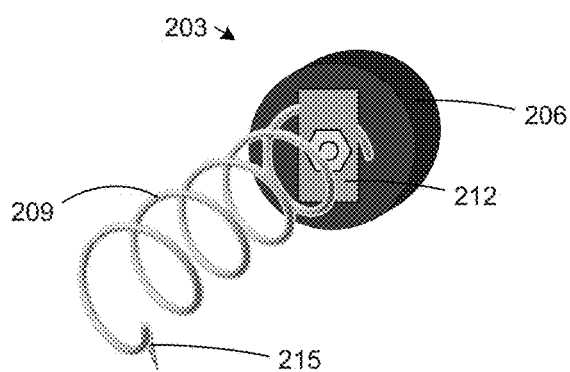
Figure 2C:
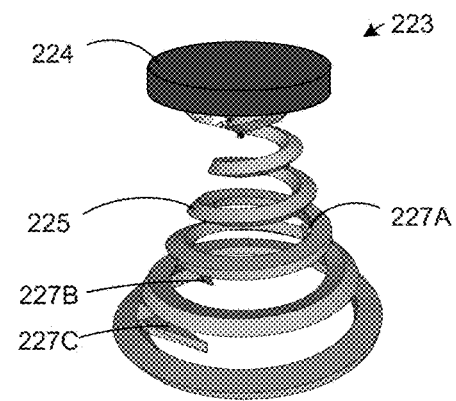
Figure 2C:
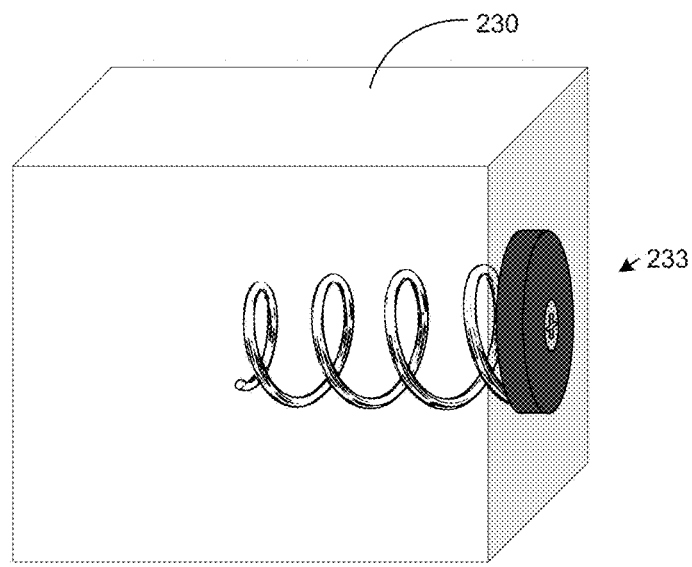

FIG. 2C shows a magnetic clasp 233 inserted into a face of a sheet insulation component 230. The magnetic clasp 233 can include any of the features described in relation to the magnetic clasps 203 and 223. The sheet insulation component 230 can be wool or wool-like, fibrous, foam-based, or other types of insulation. In some cases, a sheet magnetic component can be applied or attached to the face of the sheet insulation component 230 and over the magnetic clasp 203.

Figure 3A:
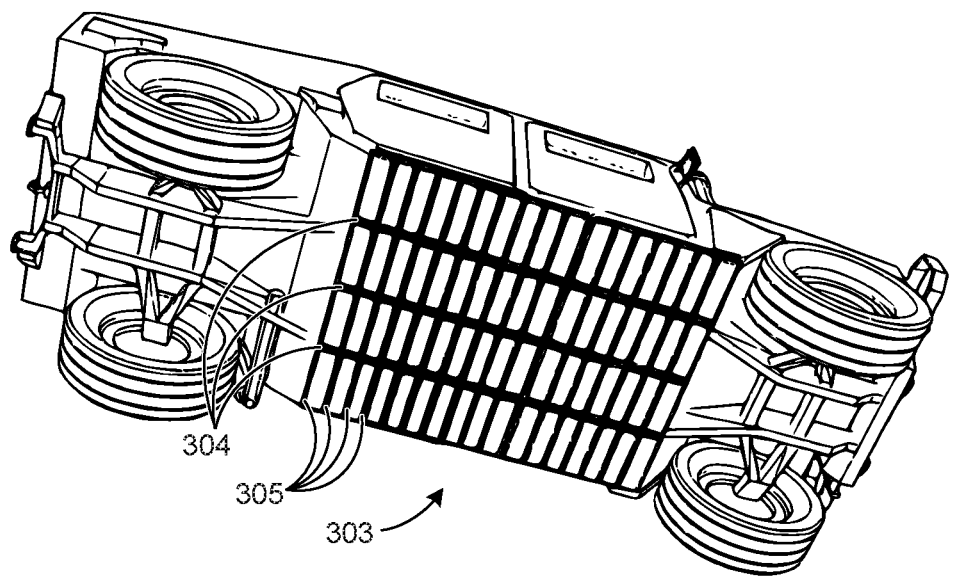
FIGS. 3A-3B illustrate perspective views of examples of magnetic insulation attached to a vehicle as armor according to various embodiments.

FIG. 3A shows a vehicle having magnetic armor 303 on the bottom of the vehicle. The magnetic armor 303 can include a sheet magnetic component and a sheet insulation component as described herein. In some examples, the magnetic armor 303 can include a plurality of panels, each panel including a sheet magnetic component and a sheet insulation component. The panels can fit edge-to-edge, for example, using edges 304 and/or 305 having a tongue and groove, ship lap, butt joint, or other type of edge design. In other examples, the magnetic armor 303 can be cut to fit a particular shape or shapes of the bottom of the vehicle.

Magnetic armor 303 can include a sheet insulation component that is a polyurea-based material or mixture. In some cases, the sheet magnetic component can also be a polyurea-based material or mixture in order to provide similar properties, flexibility, strength, and a strong bond between the sheet insulation component and the sheet magnetic component. In other examples, the magnetic armor 303 can include a sheet insulation component that is of aramid or para-aramid material. In such cases, the sheet magnetic component can also be of aramid or para-aramid material in order to provide similar properties, flexibility, strength, and strong bond between the sheet insulation component and the sheet magnetic component.

In some cases, the magnetic armor 303 can have a sheet insulation component that is relatively thick, and the sheet magnetic component of the magnetic armor 303 can be attached or connected to the sheet insulation component using a plurality of attachment components as described above. The attachment component can be designed to aid the attachment between the sheet magnetic component and the insulation. Each attachment component can also in some cases include a discrete magnetic component to increase magnetic pull at the location(s) of the attachment component(s) and also strengthen the connection between the sheet magnetic component and the sheet insulation component. In some cases, the discrete magnetic component and the sheet magnetic component can be of similar materials to aid such attachment. In some cases the sheet insulation component can differ in material composition from the discrete magnetic component and/or the sheet magnetic component.

Figure 3B:
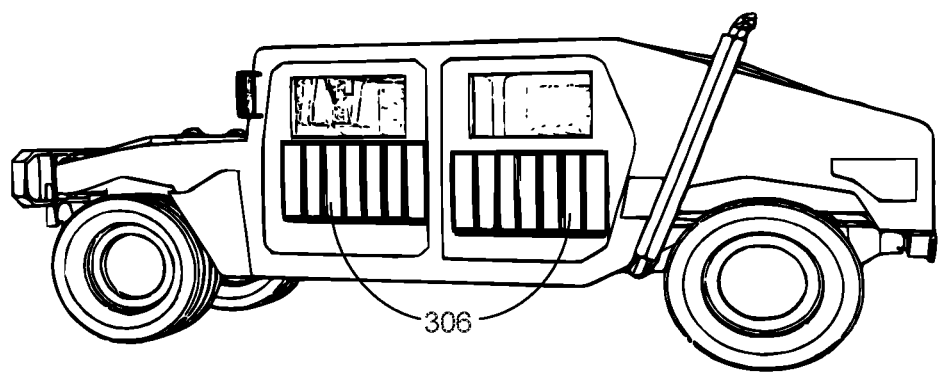

Because many vehicles incorporate ferromagnetic materials, in some cases the magnetic armor 303 can attach magnetically to the bottom of the vehicle without modification of the vehicle. In other cases, magnetic clasps or discrete magnetic components can be attached to the vehicle, and the magnetic armor 303 can attach thereto. FIG. 3B shows a vehicle having magnetic armor 306 on a side of the vehicle. As shown, the magnetic armor 306 can be on a door of the vehicle. The magnetic armor 306 can otherwise be similar to the magnetic armor 303.

Figure 4:
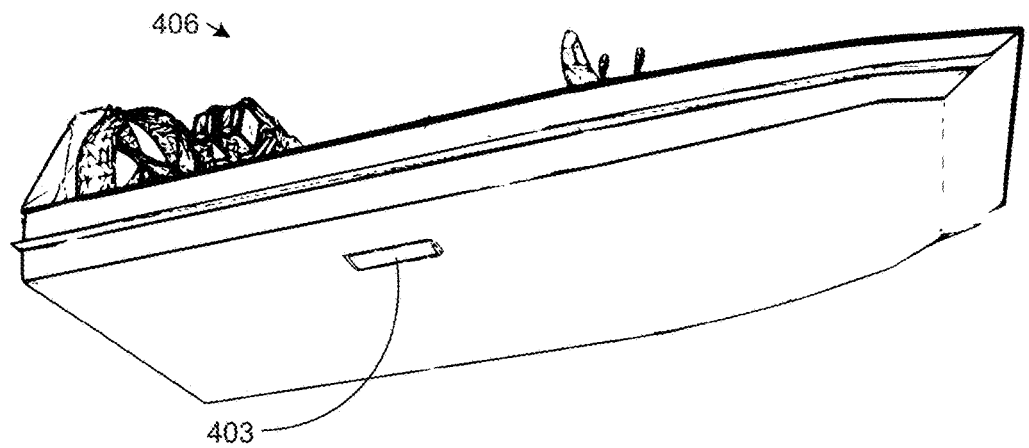
FIG. 4 illustrates a perspective view of an example of magnetic insulation attached to a boat as a patch according to various embodiments.

FIG. 4 shows a sheet magnetic component and a sheet insulation component as a magnetic patch 403 on a boat 406. The magnetic patch 403 can be used to temporarily or semi-permanently patch a hole in the bottom of the boat 406. In some cases, the hull of the boat 406 can be made of steel or other ferromagnetic material to which the sheet magnetic component is attracted. In some cases, the magnetic patch 403 can instead be used on an inside of the hull of the boat 406. In some cases, the magnetic patch 403 can be relatively thin and can include a water-impermeable and/or water-resistant polyurea-based material in the sheet insulation component. The sheet magnetic component backing of the magnetic patch 403 can also be a thin polyurea-based material to aid attachment and provide similar qualities to the sheet insulation component. The magnetic patch 403 can in some cases provide a water-tight seal on the bottom of the boat 406 or otherwise decrease water intrusion through a crack or a hole in the hull of the boat 406. In some examples, the magnetic patch 403 can be cut to fit a particular shape or shapes of the bottom of the boat 406, or to cover a crack or a hole in the hull of the boat 406.

Figure 5:
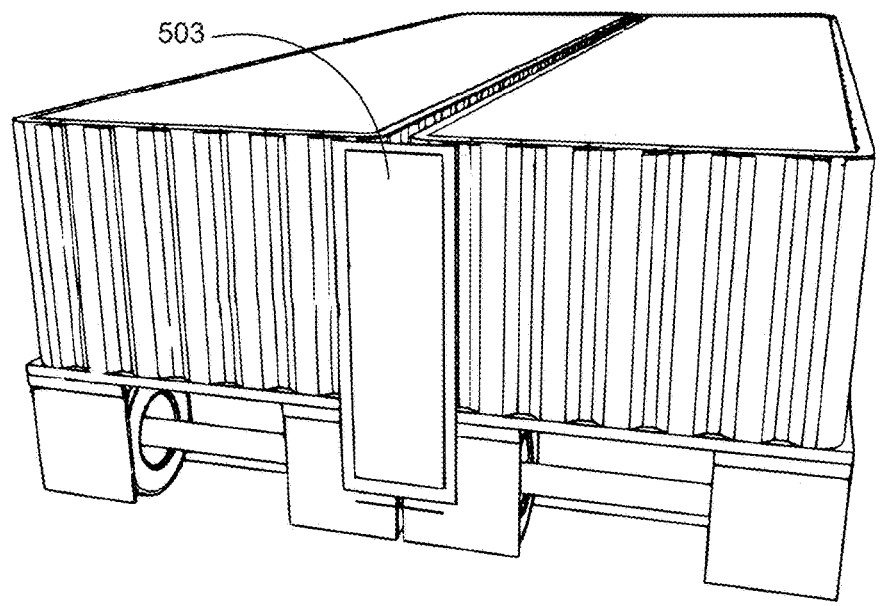
FIG. 5 illustrates a perspective view of an example of magnetic insulation attached to a structure as a wind break according to various embodiments.

FIG. 5 shows a sheet magnetic component and a sheet insulation component as a magnetic windbreak 503 for a row of frac tanks. In some embodiments, the sheet magnetized portion can extend beyond the insulation component, around the outer edges of the insulation component. In other embodiments, the sheet magnetized portion can be a sheet with the center cut out, or otherwise attached around the outer edges of the insulation component and not throughout insulation component. The magnetic component is unnecessary in the gap between the frac tanks.

Figure 6:
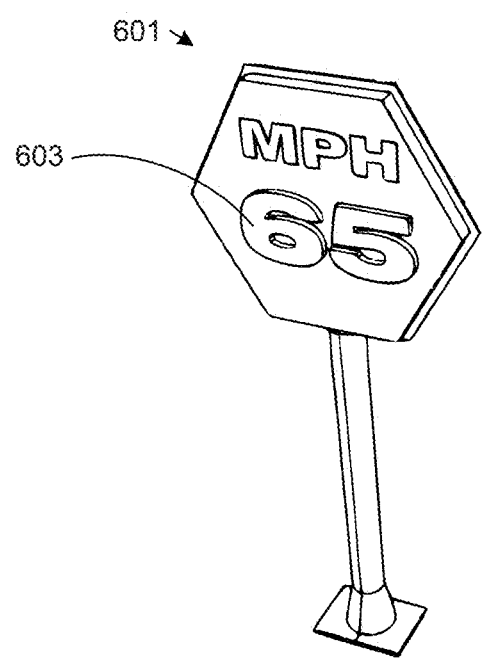
FIG. 6 illustrates a perspective view of an example of magnetic insulation attached to a sign according to various embodiments.

FIG. 6 shows a sign 601 with magnetic numbers 603 that are changeable. The magnetic numbers 603 can include a sheet magnetic component that can be of magnetized polyurea. The magnetic numbers 603 can also include a sheet insulation component attached as a facing to the sheet magnetic component. In some cases, the sheet magnetic component and/or the sheet insulation component can be formed in a number shape using a mold, or by cutting the shape from a panel including the sheet magnetic component and/or the sheet insulation component. In other examples, the sign 601 can instead be covered by a sheet or panel including the sheet magnetic component and/or the sheet insulation component that is painted to include characters for signage such as numbers, letters, and other symbols.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, the following is claimed:

1. An apparatus comprising:
   an insulation sheet comprising polyurea or polyisocyanurate, an edge of the insulation sheet having a tongue shape;
   a magnetic sheet attached to a face of the insulation sheet to form a magnetic panel, the magnetic sheet comprising ferromagnetic material and polyurea;
   the magnetic panel comprising a plurality of discrete magnetic components attached between the magnetic sheet and the insulation sheet of the magnetic panel, wherein the plurality of discrete magnetic components comprise ferromagnetic material and polyurea, and the magnetic sheet substantially covers the face of the insulation sheet and the plurality of discrete magnetic components;
   a layer of rubber that covers an outer face of the magnetic sheet; and
   a second insulation sheet comprising at least one edge having a groove shape that is complementary to the tongue shape, wherein the tongue shape is inserted into the groove shape in a tongue-and-groove design.

2. The apparatus of claim 1, wherein the plurality of discrete magnetic components arranged on the face of the insulation sheet between the magnetic sheet and the insulation sheet are disc shaped.

3. The apparatus of claim 1, further comprising a plurality of attachment components corresponding to the plurality of discrete magnetic components, the plurality of attachment components being inserted into the insulation sheet.

4. The apparatus of claim 3, wherein each of the plurality of attachment components is a spiral attachment component.

5. The apparatus of claim 3, wherein each of the plurality of attachment components comprises at least one barb.

6. The apparatus of claim 1, further comprising a sheet of foil attached to an opposite face of the insulation sheet from the face of the insulation sheet.

7. The apparatus of claim 6, wherein the sheet of foil is aluminum foil.

8. The apparatus of claim 6, wherein the sheet of foil is tin foil.

9. The apparatus of claim 1, wherein the magnetic sheet attaches the apparatus to a hull of a boat.

10. The apparatus of claim 1, wherein the magnetic sheet attaches the apparatus to a sign.

11. The apparatus of claim 1, wherein the magnetic sheet attaches the apparatus to a vehicle as armor.

12. An apparatus comprising:
- an insulation sheet comprising polyurea or polyisocyanurate, an edge of the insulation sheet having a first shape;
- a magnetic sheet attached to a face of the insulation sheet to form a magnetic panel, the magnetic sheet comprising ferromagnetic material and polyurea;
- the magnetic panel comprising a plurality of discrete magnetic components attached between the magnetic sheet and the insulation sheet of the magnetic panel, wherein the plurality of discrete magnetic components comprise ferromagnetic material and polyurea, and the magnetic sheet substantially covers the face of the insulation sheet and the plurality of discrete magnetic components;
- a layer of rubber that covers an outer face of the magnetic sheet; and
- a second insulation sheet comprising at least one edge having a second shape that is complementary to the first shape, wherein the first shape overlaps the second shape in a ship-lap design.

13. The apparatus of claim 12, wherein the plurality of discrete magnetic components arranged on the face of the insulation sheet between the magnetic sheet and the insulation sheet are disc shaped.

14. The apparatus of claim 12, further comprising a plurality of attachment components corresponding to the plurality of discrete magnetic components, the plurality of attachment components being inserted into the insulation sheet.

15. The apparatus of claim 14, wherein each of the plurality of attachment components is a spiral attachment component.

16. The apparatus of claim 14, wherein each of the plurality of attachment components comprises at least one barb.

17. The apparatus of claim 12, further comprising a sheet of foil attached to an opposite face of the insulation sheet from the face of the insulation sheet.

18. The apparatus of claim 17, wherein the sheet of foil is aluminum foil.

19. The apparatus of claim 17, wherein the sheet of foil is tin foil.

20. The apparatus of claim 12, wherein the magnetic sheet attaches the apparatus to a vehicle as armor.

* * * * *